Figure 3:
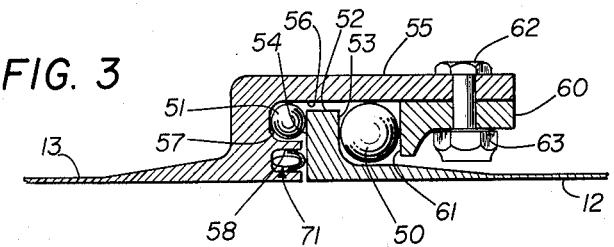

July 12, 1966          C. E. JOHNSON          3,260,049
VARIABLE VECTORING NOZZLE FOR JET PROPULSION ENGINES
Filed May 9, 1963          3 Sheets-Sheet 1
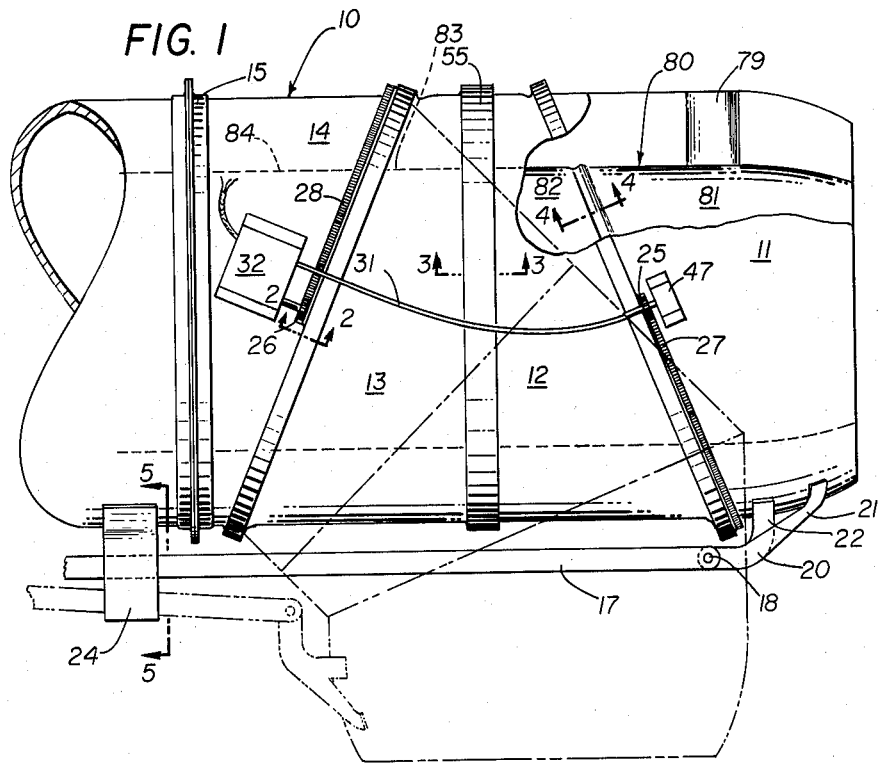
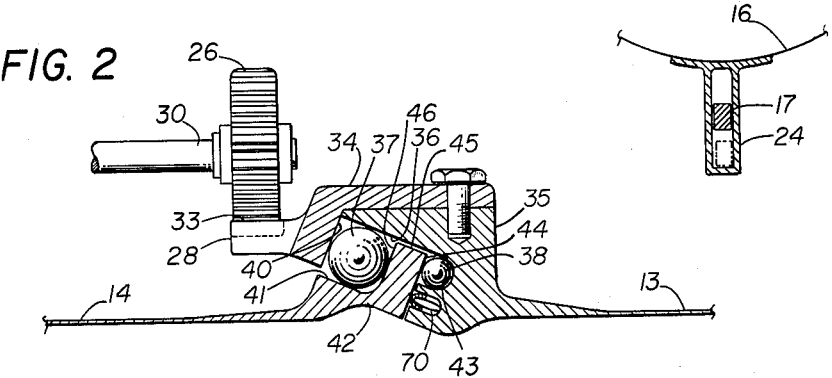
INVENTOR.
CARROLL E. JOHNSON
BY July 12, 1966  C. E. JOHNSON  3,260,049
VARIABLE VECTORING NOZZLE FOR JET PROPULSION ENGINES
Filed May 9, 1963  3 Sheets-Sheet 2

INVENTOR.
CARROLL E. JOHNSON
BY Ronald W. Mayes

July 12, 1966  C. E. JOHNSON  3,260,049
VARIABLE VECTORING NOZZLE FOR JET PROPULSION ENGINES
Filed May 9, 1963  3 Sheets-Sheet 3

INVENTOR.
CARROLL E. JOHNSON
BY Ronald W. Mayes

United States Patent Office 3,260,049
Patented July 12, 1966

3,260,049
VARIABLE VECTORING NOZZLE FOR JET PROPULSION ENGINES
Carroll E. Johnson, Fort Worth, Tex., assignor to The Boeing Company, Wichita, Kans., a corporation of Delaware
Filed May 9, 1963, Ser. No. 279,068
10 Claims. (Cl. 60—35.55)

This invention relates to variable vectoring nozzles for jet propulsion engines. More particularly, this invention relates to variable vectoring nozzles for jet pipes of jet propulsion engines that are adjustable in their down stream portion relative to the jet propulsion engine for the purpose of altering the direction of thrust of engine exhaust gases.

An object of the invention is the provision of a novel jet pipe arrangement for a jet propulsion engine suitable for varying the direction of thrust of exhaust gases therefrom.

Another object of this invention is the provision of a novel exhaust pipe arrangement for a jet propulsion engine comprising relatively rotatable wedge-shaped exhaust pipe segments referred to herein as wedges that can be turned in predetermined directions for altering the rectilinear configuration of the exhaust pipe in such a manner as to cause the exhaust pipe to assume a vectoring position of 0° to 180° so that the exhaust gases are deflected a corresponding number of degrees.

Yet another object of this invention is the provision of a novel jet pipe arrangement for causing an exhaust of a jet engine to be deflected through 0° to 180° in such a manner that the resultant thrust vector of the exhaust gases can be used to steer a vehicle, slow the vehicle, or for converting an aircraft from a conventional takeoff type aircraft to an STOL (short distance takeoff landing) or VTOL (vertical takeoff landing) aircraft.

A still further object of this invention is the provision of a novel double wedge variable vectoring nozzle suitable for use in an exhaust duct of a jet propulsion engine wherein each of the wedges are separately driven in opposite directions for causing the nozzle to move through 90 degrees so that the exhaust gases can be passed through the nozzle in a rectilinear path and/or deflected through 90 degrees. One of the advantages of this invention is that very little eccentricity of the nozzle results beyond changing the path of the exhaust gases from that of a rectilinear path to that of an exhaust path deflected through 90 degrees. Another advantage of the invention is that the present invention provides a relatively short nozzle requiring a minimum of external supporting equipment and thus having a reduced frontal area.

A still further object of this invention is the provision of a novel double wedge variable vectoring nozzle having high performance characteristics, that is simple, light weight, and easy to fabricate.

A still further object of this invention is the provision of a novel double wedge variable vectoring nozzle suitable for use in jet propulsion exhaust pipes comprising concentric inner and outer pipes, the inner pipe being for exhaust gases that may be of about twice the temperature of gases, such as heated atmospheric air, flowing in the outer pipe. The outer pipe helps cooling certain critical parts such as bearings and forms a buffer insulator against heat transfer losses between the hot inner pipe and cold atmosphere.

A still further object of the invention is the proviison of a novel double wedge variable vectoring nozzle for use in controlling an exhaust of a jet engine wherein each wedge is separately turned by suitable drive motor means simultaneously in opposite directions so that the tail pipe forms a bend of 90 degrees in a matter of a few seconds and thereby changes the flow of gases from that of rectilinear path to that of a path having a bend of 90 degrees. This capability can be used to steer the craft or give it a VTOL thrust feature.

This invention as set forth in the preceding object is especially suitable for use in an aircraft having jet engines mounted symmetrically on either side of a body line of an aircraft wherein corresponding portions of two double wedge variable vectoring nozzles are adapted to be arranged to be turned in opposite directions so that any eccentricity of resultant thrust in each nozzle will offset each other while the nozzles are being simultaneously adjusted from a rectilinear exhaust gas flow path to a flow path having a bend of 90 degrees, or viceversa. Consequently there will be no yaw of the aircraft during simultaneous transition movement of the nozzles. However if two sets of double wedges are used in one exhaust pipe, a 180 degrees bend may be obtained without any eccentricity of the nozzle center line. Although the exhaust pipe must be slightly longer this form of the invention is especially useful with single engine craft.

Figure 4:
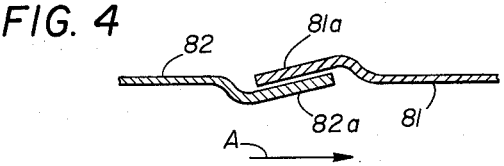
Figure 6:
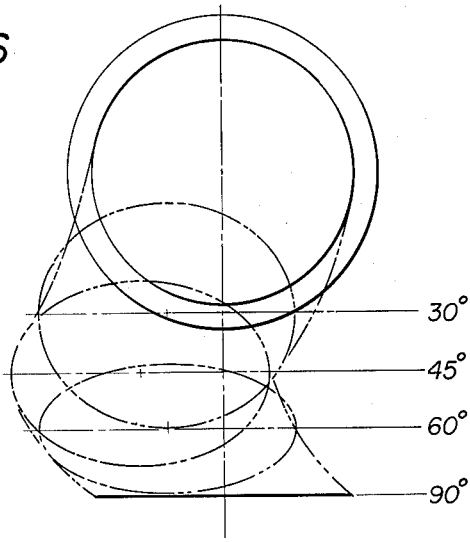
Figure 7:
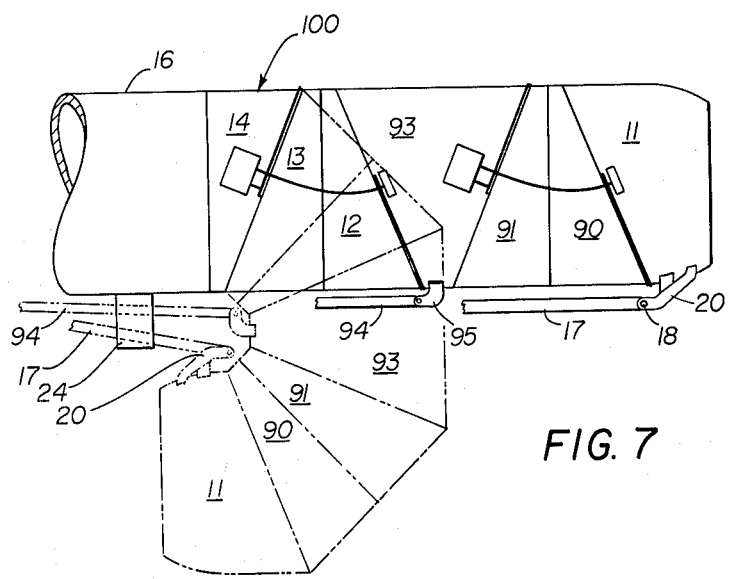
Figure 8:
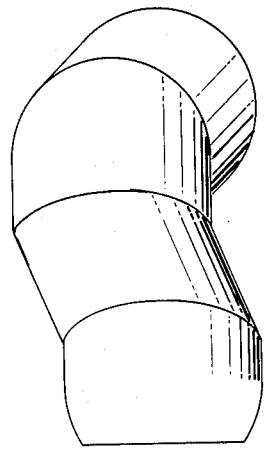
Figure 9:
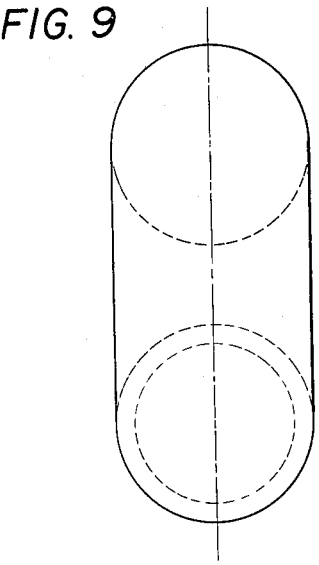

The invention further resides in certain novel features of construction, combinations, and arrangements of parts, and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which:

FIG. 1 is a side elevational view of an exhaust pipe and nozzle of a jet propulsion engine suitable for use in an aircraft, hidden lines being used to illustrate a downwardly directed VTOL thrust vectoring position of the nozzle when vertical lift or thrust is desired;

FIG. 2 is a sectional view along line 2—2 in FIG. 1;
FIG. 3 is a sectional view along line 3—3 in FIG. 1;
FIG. 4 is a sectional view along line 4—4 in FIG. 1;
FIG. 5 is a sectional view along line 5—5 in FIG. 1;
FIG. 6 is an end view of FIG. 1 and schematically illustrates with hidden lines the nozzle and its center line at various deflection angles or vector positions of zero degrees, thirty degrees, forty-five degrees, sixty degrees, and ninety degrees;

FIG. 7 schematically shows a second embodiment of the invention that employs a pair of oppositely driven double wedges for providing a VTOL thrust capability in a jet engine without eccentric or yaw thrust resultant during transition, and/or providing a full 180 degrees reverse thrust capability;

FIG. 8 is an end view of the second embodiment when it is in a VTOL or 90 degrees vectoring position showing the maximum sidewise deflection of wedge sections which occurs at this position; and FIG. 9 is also an end view of FIG. 7 when the nozzle is in a 180 degrees reverse thrust position, and shows that the exhaust duct center line is entirely coplanar.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

Referring to FIG. 1, reference number 10 indicates generally an exhaust pipe suitable for use as a conduit for exhaust gases flowing from a jet propulsion engine, not shown. The engine is preferably of a type that may be used in a vehicle, such as an aircraft. The exhaust pipe 10 comprises a nonrotatable but tiltable nozzle 11, counter-rotatable double wedges 12 and 13 and a fixed main exhaust adapter duct section 14. The wedges are preferably turnable or rotatable through at least 180 degrees. If desired the wedges can be permitted to be rotated through more than 360 degrees. As used herein, the term "rotatable" or any form thereof does not mean that a complete revolution is always required, permitted, possible, or desirable. The section 14 is provided with a radial circular flange 15 for being mated with and connected to an end flange of a main exhaust duct or conduit 16. As shown in hidden outline in FIG. 1, the nozzle 11 can be caused to be moved or tilted through 90 degrees to a downward extending position as indicated by the hidden lines so that the exhaust gases are no longer ducted along a rectilinear path but are deflected downwardly through 90 degrees for a VTOL or a directional steering capability. Although the nozzle 11 can be moved downwardly it cannot be rotated as it is held in position by a push-pull rod 17 that is pivotally connected by a pivot pin 18 to a support bracket 20. The bracket 20 is fixed to the underside of the nozzle 11 by suitable means such as riveting or welding. The bracket 20 has three prongs with only prongs 21 and 22 being shown in FIG. 1. There is another prong on the other side of prong 22 that is similar to prong 21. The push-pull rod 17 is guided in a guide bracket 24 fixed to the underside of the main exhaust duct 16. The bracket 24 is shaped to accommodate the relatively small downward movement of the push-pull rod 17 when the nozzle is tilted downwardly 90 degrees from the center line of the duct 16, FIG. 5. The push-pull rod assembly 17 may be referred to as an anti-torque mechanism since it is designed to prevent the nozzle 11 from turning about its center line relative to the fixed duct section 14 or the main duct 16. The rod 17 can be flexed sideways but cannot be twisted or bent downwardly or upwardly as viewed in FIG. 1.

The wedges 12 and 13 have portions, at least, that are elliptical shape. Similarly the nozzle 11, section 14, and perhaps if desired the exhaust duct 16 have portions, at least, that are of elliptical shape. The reason for this is that the parting lines of the wedges 12 and 13 must be circular to accommodate the rotation thereof. Accordingly, the minor axes of the elliptical exhaust duct assembly at these parting lines are extended so as to be of the same length as the major axes, thus providing a circular shape. It is accepted that a circle is an ellipse having its major and minor axes of equal length. If desired, the remaining portions of the wedges 12, 13, the nozzle 11, and the ducts 14 and 16 may be of circular cross-section.

The joining of the wedge 13 with the duct 14 is illustrated in FIG. 2 in cross-section. Duct 12 is similarly joined with the nozzle 11 and therefore has a joint with a cross-section similar to FIG. 2. Each of the ducts 12 and 13 are supported by ball bearings and driven by spur gears 25 and 26 that respectively engage circular or arcuate rack gear segments 27 and 28. The segment 27 is fixed to the wedge 12 and extends in a circle through at least 180 degrees on the outer periphery of the wedge 12. The circular or arcuate rack 28 in a similar manner is fixed to the segment 13 and extends for at least 180 degrees in an opposite direction as shown in FIG. 1. The gears 25 and 26 are respectively driven by flexible drive shafts 30 and 31 by an electrical synchronous motor 32 having adjustable stops, not shown. The shaft 30 may be nonflexible, if desired.

Referring to FIG. 2, the drive gear 26 engages a toothed portion 33 of the rack 28. The rack 28 has a radially and rearwardly extending circular flange 34 adapted to abut and be bolted to a circular flange 35 that is fixed to the outer wall surface of the wedge 13. The flange 35 has a cylindrical wall portion 36 which serves as an outer race for parallel rows of ball bearings 37 and 38. It will be understood that the rows comprise numerous ball bearings 37 and 38. The ball bearings 37 are larger than the ball bearings 38. The bearings 37 bear against an inner end of a planar annular wall 40 of the rack 28, the cylindrical wall 36, and an outwardly facing cylindrical wall 41. The wall 41 forms an inner race for the bearing 37 and forms a part of a Z-shaped or stepped ring portion 42 fixed to the adapter duct section 14.

The small balls 38 ride in a U-shaped or channel-shaped outer bearing race portion 43 of the flange 35 and bear against the cylindrical wall 36 of the flange 35. The race portion 43 is but an extension of the outer race wall 36. The inner race for the balls 38 comprises one flat side 44 of a planar ring portion 45 of the stepped adapter 42, an opposite side 46 of the portion 45 comprises a planar ring portion which supports the large ball bearings 37 as an inner race therefor. The wedge portion 13 therefor is supported by the thrust and journal ball bearings 37 and 38 against relative displacement from the portion 14 except in the direction driven by the motor 32.

The wedge 13 is driven in a clockwise direction, as viewed from the left of FIG. 1. Simultaneously, the motor 32 drives the wedge 12 in a counterclockwise direction. Although the drive arrangement for only the wedge 13 has been described with relationship to FIG. 2 it is to be understood that the drive arrangement and the thrust bearing support means provided between the wedges 13 and 14 and that provided between wedge 12 and nozzle 11 are similar. The arcuate rack 27 is fixed to and carried by the wedge 12. An outer end of the flexible shaft 31 is journaled in a bearing and bracket assembly 47 fixed to the nozzle 11. The drive gear 25 is fixed to the shaft 31 near the assembly 47.

The journal and thrust bearing support means for holding the two wedges 12 and 13 in opposed, spaced relationship is shown in FIG. 3. This is accomplished by the use of circular thrust bearing rings having a row of large ball bearings 50 and a parallel row of small ball bearings 51. A radially outwardly extending planar and circular flange 52 has parallel faces 53 and 54 adapted to respectively support the two rows of the balls 50 and 51, and thus function as inner races. The outer races for the balls 50 and 51 comprises an L-shaped or angular ring 55 having its short leg fixed to the wedge 13. A longer leg of the ring 55 has a cylindrical surface portion 56 forming an outer race for both of the balls 50 and 51. The balls 51 are cradled in a U-shaped or horseshoe-shaped race portion 57 that terminates in a cylindrical flange 58 disposed parallel to the outer race 56. Also a circular ball retainer ring 60 having a planar annular face portion 61, FIG. 3, forms an outer race for the balls 50. This portion 60 is bolted to the inside of the ring 55 by a suitable fastening means such as bolts 62 and nuts 63. Accordingly, the wedges 12 and 13 can be rotated relative to each other but cannot be pulled apart or jammed together due to the relatively strong bearing assembly, FIG. 3.

Both of the journal and thrust ball bearing assemblies shown in FIGS. 2 and 3 are sealed so as to prohibit the transgression of atmospheric air or exhaust gases therethrough by means of seal assemblies, respectively indicated generally by reference numerals 70 and 71 in FIGS. 2 and 3. Each seal assembly has a two-piece sealing ring expander member 72 comprising two 180 degree arcuate segments of spring steel. The ring 72 has an elliptical cross-section with the major axis of thereof perpendicular to the central axis of the ring. The sealing ring assembly 70 in FIG. 2 is seated in a sealing ring groove juxtaposed concentrically beside the hook-shaped race 43 so that the sealing ring assembly 70 bears against and sealingly engages the race 44. Similarly, the sealing ring assembly 71 occupies a groove concentrically disposed beside the hook-shaped race 57. The sealing ring assembly 71 bears against and sealingly engages the race 54, FIG. 3. More particularly, a channel-shaped circular sealing ring 74, preferably made of spring steel, is disposed over the expander ring 72 and bears against the race 54 of the flange 52 in FIG. 3. The sealing ring 74 of the assembly 70 bears against the race 44 of the member 42 in FIG. 2. The expander ring 72 is peripherally compressed along its major axis when installed so as to prevent the transgression of gases therepast.

One of the advantages of this invention is that the exhaust duct may comprise an inner duct for conducting very hot gases from the jet propulsion system and a coaxial annular outer duct for conducting heated gases such as atmospheric air, but at a cooler temperature. In this manner, critical parts such as bearings are cooled and the inner duct is essentially insulated from the occurrence of high heat transfer losses during its operation, particularly in very cold ambient atmosphere. It is not necessary that the inner duct portion, as indicated generally by the reference numeral 80 in FIG. 1, be supported by elaborate thrust bearing assemblies as shown in FIGS. 2 and 3 since support is provided by radially extending, rigid vane-like strut portions such as indicated by reference numeral 79. Accordingly, overlapping or telescoping flange portions much in the manner of a stovepipe arrangement as shown in FIG. 4 are adequate so long as relative motion between the juxtaposed, telescoped members is permitted. FIG. 4 is a section between an inner duct member 81 within the exhaust nozzle 11 and a wedge-shaped inner duct member 82 within the wedge 12. The exhaust duct 10 has a wedge-shaped inner duct member 83 within the wedge 13, a wedge-shaped inner duct member 84 within the wedge 14, and an inner conduit 85 within the fixed conduit section 16. Each inner conduit 81, 82, 83, 84 is supported by a plurality of struts within the conduits 11, 12, 13, 14, respectively. In FIG. 4, the nozzle member 81 is telescoped over the inner wedge member 82 at their respective ends 81a, 82a. Since the flow of gas is shown flowing to the right by arrow A in FIG. 4, it is preferred that the flange 82a be cylindrical and disposed inside the cylindrical flange 81a so that hot gases would tend to flow past the joint and cooler gases would tend to be pulled through the joint between flanges 81a and 82a. If the flange 81a were inside flange 82a it is obvious that the exhaust gases would have more of a tendency to exit through the joint rather than flow past the joint in an undisturbed manner.

The nozzle 11 is moved downwardly and upwardly to and from a vectoring position, as shown in the hidden lines in FIG. 1, by the motor 32 driving the wedges 12 and 13 in opposite directions. The wedges 12 and 13 are driven in counterclockwise and clockwise directions, as viewed from the left of FIG. 1, when it is desired to position the nozzle downwardly into a VTOL position. The anti-torque mechanism 17, 18, 20, 21, 24 prevents the relative angular displacement or rotation of the nozzle 11. The nozzle 11 is caused to be turned to the 90 degree vectoring position as shown in FIG. 1 if the wedges 12 and 13 are turned through a full 180 degrees. As the nozzle 11 is turned down to a deflection angle of 30 degrees it is seen in FIG. 6 that the center line thereof moves to the left of the center line of the duct 10; and as the nozzle 11 moves to the 45 degree vectoring position the nozzle center line is at its maximum point of deflection or eccentricity relative to the center line of the duct 10. The center line of the nozzle 11 moves to a 60 degree thrust vectoring position, its deviation from the center line of the duct 10 is the same as when the nozzle 11 is at 30 degree vectoring position. When the nozzle 11 is at the 90 degree vectoring position, FIG. 6, the center line of the nozzle 11 is coincidental with the center line of the duct 10. In other words the nozzle 11, wedges 12 and 13, and the ducts 14 and 16 are coplanar. Inasmuch as the syncho motor 32 takes only a short time, as for example two seconds, to move the nozzle 11 to the 90 degree vectoring position there is only a momentary period of time for an aircraft or other vehicle to tend to yaw to the right as viewed in FIG. 5. However, if there are an even number of ducts embodying the invention, extending from one or more jet engines and having like wedges adapted to be rotated in opposite directions, yaw effects inherent in one duct of the FIG. 1 configuration will be canceled. If desired, there can be two jet engines and two exhaust ducts extending therefrom, each embodying the invention, whereby the eccentricity will be offset.

Another embodiment of this invention is shown in FIGS. 7, 8 and 9. The unit, indicated generally by the reference numeral 100, comprises an additional set of rotatable double wedges 90, 91 and a stationary adapter wedge 93 in addition to the first set of double wedges 12, 13. The wedges 13 and 90 are rotated in directions opposite to the wedges 12 and 91. The wedges 13 and 91 are identical and the wedges 12 and 90 are identical. It is to be understood that inner ducts, similar to the ducts 81, 82, 83, 84 of FIG. 1, may be provided if desired. The nozzle 11 is held against angular rotation about the central duct axis by the anti-torque mechanism, comprising the flexible bar 17 guided in the bracket 24 as described hereinabove. Since the adapter wedge 93 must also be held against angular displacement about the central duct axis or center line, a second anti-torque mechanism, comprising a flexible bar 94, is provided. The bar 94 is pivotally connected to a bracket 95, fixed to the underside of the adapter section 93. The left hand or forward end of the bar 94 is slidably guided in a bracket similar to the bracket 24 mounted in side-by-side relationship therewith and fixed to the underside of the duct 16. Inasmuch as the two push-pull rods 17 and 94 are spaced apart, side-by-side relationship they will not interfere with each other when the nozzle 11 of FIG. 7 is moved to a 90 degree or a 180 degree thrust vectoring position for VTOL or reverse thrust braking purposes, respectively.

One of the important features of the unit 100, FIG. 7, is that the nozzle 11 is never out of line with the main duct 16, as occurs in the unit 10. Accordingly, the rod 17 need not be flexible for port and/or starboard lateral deflection, but may be completely rigid if desired. However, the push-pull rod 94 must be just as flexible as the rod 17 in FIG. 1 since it must undergo as much port or starboard lateral deflection. Maximum deflection or deviation of the wedge section from the center line of the unit 100 occurs when each of the wedges 12, 13, 90, 91 are turned through 90 degrees from the normal straight duct position to the 90 degree vectoring position of the nozzle 11, FIG. 8. All of the sections of the duct 100 are coplanar when the wedges 12, 13, 90, 91 are turned through 180 degrees from the normal straight duct position as shown in FIG. 9. In contradistinction thereto, when the two wedges 12, 13 in the embodiment of FIG. 1 are turned through 90 degrees and thus placing the nozzle 11 at a 45 degree vectoring position, maximum deflection of the nozzle 11 occurs. This deflection is equal to approximately one-third of the diameter of the nozzle 11.

It will be noted that the deflection of the nozzle 11 in FIG. 7 could be twice the maximum of the nozzle in FIG. 1, if the second set of wedges 90, 91 were driven in the same angular directions as the oppositely driven wedges 13, 12, respectively. However, this is not the case in FIG. 7 since the nozzles 12, 90 are respectively driven in angular directions opposite to the wedges 13, 91. In either case, the maximum bend in the ducts 10, 100 occurs when the nozzle is in 90 degree vectoring position, such as for VTOL. These bends can be minimized by keeping the axial length of the wedges 12, 13, 90, 91 as short as possible. The slant or inclination of the parting lines between the wedges and adapter sections or nozzle can be maintained at a minimum for minimum wedge axial length by the careful selection of the dimensions for the elliptical portions of the adapter ducts, wedges, and nozzle.

Since a 90 degree vectoring position is desired with the wedges 12, 13, the parting lines defined by the circular racks must be inclined to 22½ degrees to the vertical, assuming a horizontal rectilinear longitudinal axis of the duct 10. The inclinations of the parting lines of the wedges 90, 91 of the duct 100 in FIG. 7 are also 22½ degrees to the vertical, assuming a horizontal center line. If the 22½ degree inclination of parts of the duct 100 in FIG. 7 were only 11¼ degrees, the nozzle 11 could be positioned at 90 degrees vectoring position but would not have a 180 degree vectoring or reverse thrust position. However, the advantage of having a smaller hump or deviation in the duct 100 would be obtained.

It will be understood that this invention can be modified to adapt it to various circumstances and conditions, and it is accordingly desired to comprehend within the purview of this invention such modifications as may be considered to fall within the scope of the appended claims.

What is claimed is:

1. A variable vectoring nozzle for a jet propulsion engine capable of generating exhaust gases comprising,
   exhaust duct means,
   first and second wedge-shaped duct section means rotatably supported in said exhaust duct means,
   nozzle means rotatably connected to said exhaust duct means,
   drive means having two separate drive shafts for simultaneously turning said first and second wedge-shaped duct section means by said separate drive shafts in opposite directions and controlling and varying the direction of thrust of the exhaust gases, and
   means for controlling the angular relationship of said nozzzle means relative to said exhaust duct means.

2. A variable vectoring nozzle for a jet propulsion engine capable of generating exhaust gases comprising,
   exhaust duct means,
   first and second wedge-shaped duct section means rotatably supported in said exhaust duct means,
   third and fourth wedge-shaped duct section means rotatably supported in said exhaust duct means,
   drive means for simultaneously turning said wedge-shaped duct section means,
   nozzle means rotatably connected to said exhaust duct means, and
   means for maintaining the angular disposition of said duct means and said nozzle means in a predetermined angular relationship about the axes of rotation thereof.

3. A variable vectoring nozzle for a jet propulsion engine capable of generating exhaust gases,
   exhaust duct means,
   nonrotatable nozzle means connected to said exhaust duct means,
   first and second wedge-shaped duct section means rotatably supported in said exahust duct means, said first and second wedge-shaped duct section means having juxtaposed ends rotatably connected together in an end to end coaxial relationship, the opposite ends of said first and second wedge-shaped duct section means defining mutually intersecting planes intersecting the axis of rotation thereof at oblique angles,
   drive means for driving said first and second wedge-shaped duct section means in opposite directions, and
   means for controlling the angular position of said nozzle means relative to said exhaust duct means.

4. A variable vectoring nozzle for a jet propulsion engine capable of generating exhaust gases comprising,
   exhaust duct means,
   first and second wedge-shaped duct section means rotatably supported in said exhaust duct means,
   third and fourth wedge-shaped duct section means rotatably supported in said exhaust duct means,
   drive means for turning said wedge-shaped duct section means about the axis rotation thereof,
   nozzle means connected to said fourth wedge-shaped duct section means,
   antitorque mechanism means for preventing the angular displacement of said nozzle means about the axis of rotation thereof when said fourth wedge-shaped duct section means are turned.

5. A jet pipe arrangement for a jet propulsion engine capable of generating exhaust gases,
   first and second exhaust duct means,
   nonrotatable nozzle means connected to said exhaust duct means,
   first and second wedge-shaped duct section means rotatably connected together in tandem and respectively rotatably connected in tandem to said first and second exhaust duct means, said first and second wedge-shaped duct section means having juxtaposed ends rotatably connected together in such a manner that an end to end coaxial relationship is maintained, and said first and second wedge-shaped duct section means having opposite ends defining mutually intersecting planes intersecting the axis of rotation of said first and second wedge-shaped duct section means at oblique angles,
   drive means for individually driving said first and second wedge-shaped duct section means in selected directions, and
   means for controlling the angular position of said first and second exhaust duct means.

6. A variable vectoring nozzle for a jet propulsion engine capable of generating exhaust gases comprising,
   first and second exhaust duct means having opposed ends,
   first and second wedge-shaped duct section means with juxtaposed ends thereof rotatably connected together in tandem and with the opposite ends thereof respectively rotatably connected in tandem to opposed ends of said first and second exhaust duct means,
   nozzle means,
   third and fourth wedge-shaped duct section means with juxtaposed ends thereof rotatably connected together and having opposite ends thereof respectively rotably connected to opposed ends of said second exhaust duct means and said nozzle means,
   first and second inner duct means respectively carried by said first and second exhaust duct means,
   telescoping and rotatably connected third and fourth inner duct means respectively carried by said first and second wedge-shaped duct section means, said third inner duct means having one end telescoping and rotatably connected to one end of said first inner duct means, said fourth inner duct means having one end telescoping and rotatably connected to one end of said second inner duct means,
   telescoping and rotatably connected fifth and sixth inner duct means respectively carried by said third and fourth wedge-shaped exhaust duct means, said fifth inner duct means telescoping and being rotatably connected to one end of said fourth inner duct means,
   seventh inner duct means carried by said nozzle means and having one end telescoping and rotatably connected to one end of said sixth inner duct means,
   antitorque mechanism means holding said first and second exhaust duct means and said nozzle means in such a manner as to prevent the relative rotation thereof relative to each other about the axes of rotation thereof, and
   drive means for selectively angularly positioning said wedge-shaped duct section means about the axes of rotation thereof for selectively positioning said nozzle means in thrust vectoring positions including vertical and reverse thrust positions.

7. A variable vectoring nozzle for a jet propulsion engine capable of generating exhaust gases comprising,
   first and second exhaust duct means having opposed ends,
   first and second wedge-shaped duct section means with juxtaposed ends thereof rotatably connected together in tandem and with the opposite ends thereof respectively rotatably connected in tandem to opposed ends of said first and second exhaust duct means, nozzle means, third and fourth wedge-shaped duct section means with juxtaposed ends thereof rotatably connected together and having opposite ends thereof respectively rotatably connected to opposed ends of said second exhaust duct means and said nozzle means, antitroque mechanism means holding said first and second exhaust duct means and said nozzle means in such a manner as to prevent the relative rotation thereof relative to each other about the axes of rotation thereof, and drive means for turning said wedge-shaped exhaust duct means for selectively positoning said nozzle means in thrust vectoring positions including vertical and reverse thrust positions.

8. A variable vectoring nozzle for a jet propulsion engine capable of generating exhaust gases comprising, nozzle means, exhaust duct means, first and second wedge-shaped duct section means with juxtaposed ends thereof rotatably connected together in tandem and with the opposite ends thereof respectively rotatably connected in tandem to the opposed ends of said nozzle means and said exhaust duct means, drive means for selectively angularly positioning said first and second wedge-shaped duct section means about the axes of rotation thereof for selectively positioning said nozzle means in vectoring positions including vertical thrust position, means for controlling the angular disposition of said exhaust duct means and said nozzle means about the axes of rotation thereof, first and second inner duct means respectively carried by said nozzle means and said exhaust duct means, and telescoping and rotatably connected third and fourth inner duct means respectively carried by said nozzle means and said wedge-shaped duct section means, said third inner duct means having one end telescoping and rotatably connected to one end of said nozzle means, and said fourth inner duct means having one end telescoping and rotatably connected to one end of said second inner duct means.

9. A duct arrangement for conducting a fluid comprising, first and second duct means having opposed ends, first and second wedge-shaped duct section means with juxtaposed circular ends thereof rotatably connected together in tandem and with the opposite circular ends thereof respectively rotatably connected in tandem to opposed circular ends of said first and second exhaust duct means, drive means for selectively angularly positioning said first and second wedge-shaped duct section means about the axis of rotation thereof, and means for preventing the angular displacement of said first and second exhaust duct means about the axes of rotation thereof.

10. A duct arrangement for conducting a fluid comprising, nonrotatable first and second and third duct means having opposed ends, first and second wedge-shaped duct section means with juxtaposed ends thereof rotatably connected together in tandem and with the opposite ends thereof respectively rotatably connected in tandem to opposed ends of said first and second duct means, first drive means for selectively angularly positioning said first and second wedge-shaped duct section means about the axis of rotation thereof, third and fourth wedge-shaped duct section means with juxtaposed ends thereof rotatably connected together and having opposite ends thereof respectively rotatably connected to opposed ends of said second and third duct means, means for controlling the angular disposition of said first and second and third duct means about the axes of rotation thereof, and second drive means for selectively angularly positioning said third and fourth wedge-shaped duct section means about the axis of rotation thereof opposite in direction to said first and second wedge-shaped duct section means for forming a bend of the duct arrangement that can be as much as 180 degrees.

References Cited by the Examiner

UNITED STATES PATENTS

| 2,823,703 | 2/1958 | Nusser | 285—181 |
| 2,933,891 | 4/1960 | Britt | 60—35.55 |
| 2,986,877 | 6/1961 | Emmons et al. | 60—35.55 |
| 3,067,579 | 12/1962 | Olbrich | 60—35.55 |

FOREIGN PATENTS

| 755,019 | 8/1956 | Great Britain. |

MARK NEWMAN, *Primary Examiner.*

SAMUEL LEVINE, *Examiner.*

T. BLUMENSTOCK, R. D. BLAKESLEE,
*Assistant Examiners.*